United States Patent [19]
Childress

[11] Patent Number: 4,821,292
[45] Date of Patent: Apr. 11, 1989

[54] ADAPTIVE LIMITER/DETECTOR WHICH CHANGES TIME CONSTANT UPON DETECTION OF DOTTING PATTERN

[75] Inventor: Jeffrey S. Childress, Lynchburg, Va.

[73] Assignee: General Electric Company, New York, N.Y.

[21] Appl. No.: 56,924

[22] Filed: Jun. 3, 1987

[51] Int. Cl.$^4$ ............................................. H04L 25/06
[52] U.S. Cl. ...................................... 375/76; 375/114; 307/359
[58] Field of Search .......................... 375/76, 110, 114; 307/234, 264, 358, 359; 328/164

[56] References Cited

U.S. PATENT DOCUMENTS

| | | | |
|---|---|---|---|
| 3,292,178 | 12/1966 | Magnuski | 375/7 |
| 3,458,664 | 7/1969 | Adlhoch et al. | 455/34 |
| 3,509,279 | 4/1970 | Martin et al. | 375/76 |
| 3,571,519 | 3/1971 | Tsimbidis | 379/63 |
| 3,696,210 | 10/1972 | Peterson et al. | 370/13 |
| 3,801,956 | 4/1974 | Braun et al. | 375/94 |
| 3,906,166 | 9/1975 | Cooper et al. | 379/60 |
| 3,936,616 | 2/1976 | DiGianfilippo | 379/63 |
| 3,970,801 | 7/1976 | Ross et al. | 379/63 |
| 4,001,693 | 1/1977 | Stackhouse et al. | 455/51 |
| 4,010,327 | 3/1977 | Kobrinetz et al. | 379/58 |
| 4,012,597 | 3/1977 | Lynk, Jr. et al. | 455/53 |
| 4,022,973 | 5/1977 | Stackhouse | 375/114 |
| 4,027,243 | 5/1977 | Stackhouse | 375/114 |
| 4,029,901 | 6/1977 | Campbell | 379/58 |
| 4,128,740 | 12/1978 | Graziano | 455/33 |
| 4,131,849 | 12/1978 | Freeburg et al. | 375/5 |
| 4,184,118 | 1/1980 | Cannalte et al. | 370/77 |
| 4,231,114 | 10/1980 | Dolikian | 455/49 |
| 4,267,592 | 5/1981 | Craiglow | 370/29 |
| 4,307,465 | 12/1981 | Geller | 375/76 |
| 4,309,772 | 1/1982 | Kloker et al. | 375/76 |
| 4,312,070 | 1/1982 | Coombes et al. | 371/40 |
| 4,312,074 | 1/1982 | Pautler et al. | 375/96 |
| 4,318,128 | 3/1982 | Sauvanet | 307/359 |
| 4,322,576 | 3/1982 | Miller | 380/29 |
| 4,326,264 | 4/1982 | Cohen et al. | 364/900 |
| 4,339,727 | 7/1982 | Kage et al. | 307/359 |
| 4,339,823 | 7/1982 | Predina et al. | 375/20 |
| 4,347,625 | 8/1982 | Williams | 455/17 |
| 4,360,927 | 11/1982 | Bowen et al. | 455/17 |
| 4,369,443 | 1/1983 | Giallanza et al. | 455/31 |
| 4,382,298 | 5/1983 | Evans | 371/6 |
| 4,400,585 | 8/1983 | Kamen et al. | 379/63 |
| 4,409,687 | 10/1983 | Berti et al. | 455/7 |
| 4,418,425 | 11/1983 | Fennel, Jr. et al. | 380/33 |

(List continued on next page.)

OTHER PUBLICATIONS

Federal Information Processing Standards, Pub. No. 46, Data Encryption Standard, U.S. Dept. of Comm., NTIS (5285 Port Royal Rd., Springfield, VA 22161), "Voice and Data Transmission", Arrendondo, Teggeler and Smith, Bell Systems Technology Journal, vol. 58, No. 1, Jan. 1978, pp. 97–122.

Primary Examiner—Robert L. Griffin
Assistant Examiner—Stephen Chin
Attorney, Agent, or Firm—Nixon & Vanderhye

[57] ABSTRACT

A limiter/detector which takes advantage of the characteristics of the dotting pattern preceding each message in the General Electric Public Service Trunking System shortens bit synchronization acquisition time and improves incoming signal detection. Since the lowest frequency component in the dotting pattern is 4800 Hz, the time constant of the receiver adaptive limiter is decreased from 0.1 seconds to 0.33 microseconds (corresponding to a cut-off frequency of 3 KHz) during the time a dotting pattern is (or might be) received. This decreased time constant allows the limiter to adapt much more rapidly to the DC component of the incoming data signal. Upon successful decoding of the dotting pattern preceding the message, the limiter circuit time constant is changed to 0.1 seconds to allow lower frequency digital data signal components (e.g., those lower frequency components associated with word sync patterns such as Barker codes) to be detected. The limiter provides the advantages of decreased falsing rate, more reliable detection of word sync, more rapid acquisition of bit sync, better utilization of processing resources, simplification of initial signal detection routines and/or circuitry, and more rapid adaptivity to incoming signalling.

8 Claims, 5 Drawing Sheets

U.S. PATENT DOCUMENTS

| | | | |
|---|---|---|---|
| 4,430,742 | 2/1984 | Milleker et al. | 375/5 |
| 4,430,755 | 2/1984 | Nadir et al. | 455/77 |
| 4,433,256 | 2/1984 | Dolikian | 307/358 |
| 4,434,323 | 2/1984 | Levine et al. | 380/48 |
| 4,450,573 | 5/1984 | Noble | 375/104 |
| 4,485,486 | 11/1984 | Webb et al. | 455/33 |
| 4,575,863 | 3/1986 | Butcher et al. | 375/114 |
| 4,578,815 | 3/1986 | Persinotti | 455/15 |
| 4,625,320 | 11/1986 | Butcher | 307/264 |
| 4,631,737 | 12/1986 | Davis et al. | 375/88 |
| 4,663,765 | 5/1987 | Sutphin et al. | 375/114 |
| 4,698,805 | 10/1987 | Sasuta et al. | 370/97 |

FIG. 1 (A)
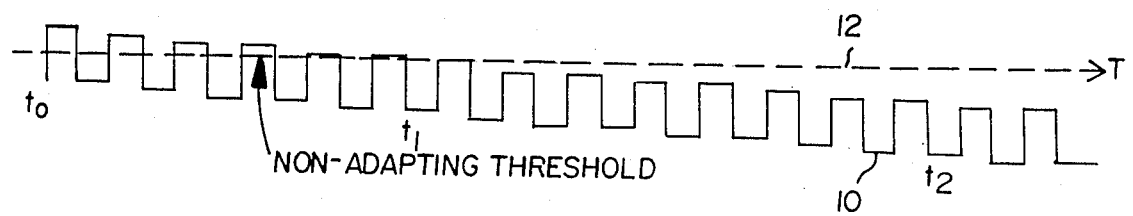
NON-ADAPTING THRESHOLD
FIG. 1 (B)
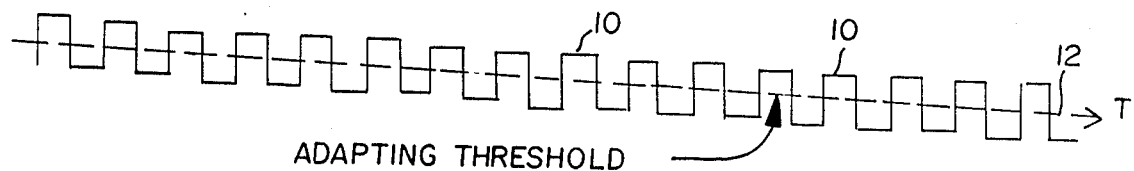
ADAPTING THRESHOLD
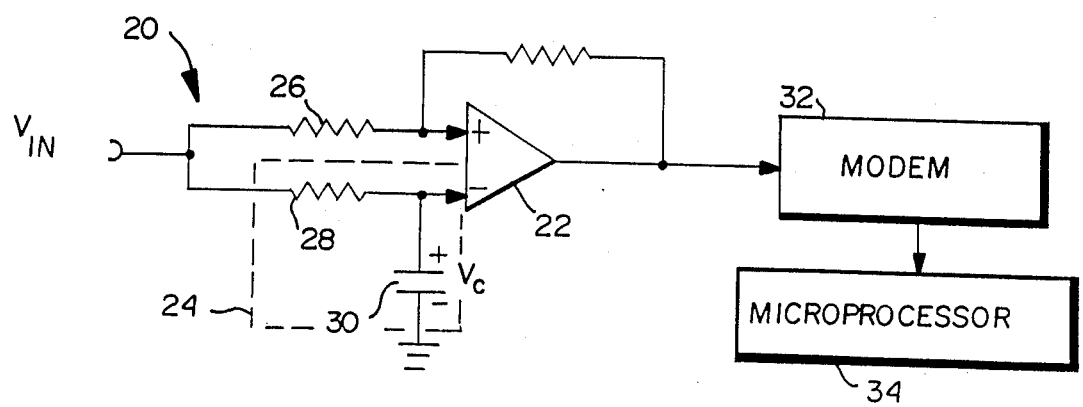
FIG. 2 PRIOR ART

| | MIN(msec) | TYP(msec) | MAX*(msec) |
|---|---|---|---|
| $t_s$ = TIME TO SYNC & START TX | 20 | 35 | 50 |
| $t_{tx}$ = TX TIME | 30 | 30 | 30 |
| $t_w$ = WAIT TIME | 60 | 60 | 90 |
| $t_{ca}$ = CHANNEL ASSIGNMENT TIME | 30 | 30 | 30 |
| $t_{wc}$ = TIME TO WORKING CHANNEL | 15 | 20 | 25 |
| $t_c$ = TIME TO CONFIRMATION | 15 | 15 | 45 |
| $t_{cd}$ = TIME BETWEEN CONFIRMATION & DOTTING | 20 | 20 | 25 |
| $t_d$ = TIME FOR SENDING DOTTING | 60 | 60 | 60 |
| $t_u$ = TIME TO UNMUTE | 0 | 10 | 30 |
| | 250 | 280 | 385 |

*MAXIMUM ASSUMING SUCCESS

ADAPTIVE LIMITER/DETECTOR WHICH CHANGES TIME CONSTANT UPON DETECTION OF DOTTING PATTERN

CROSS-REFERENCE TO RELATED APPLICATIONS

This application is related to commonly-assigned application Ser. No. 056,922 of Childress at al filed concurrently herewith entitled "Trunked Radio Repeater System", the disclosure of which is incorporated by reference herein.

FIELD OF THE INVENTION

The present invention relates to digital radio communications receivers, and more particularly, to detection and decoding of digital signals transmitted over a slotted radio frequency communications control channel of a digitally trunked communications system.

BACKGROUND AND SUMMARY OF THE INVENTION

It is now common for digital signals to be transmitted over radio frequency communications channels. Received demodulated digital signals typically have AC and DC components—that is, the incoming digital bit stream is typically superimposed upon a DC level the amplitude of which depends upon several factors (e.g., the difference between the transmitter RF carrier frequency and the receiver RF tuning frequency, and the biasing of the receiver radio frequency circuitry). This DC component can vary greatly in dependence on these factors.

It usually takes on the order of 10–20 milliseconds or so for a receiver to "lock on" to the transmit carrier frequency (e.g., by operation of a tracking feedback-controlled phase locked loop local oscillator as is well known). The level of the DC component upon which the incoming digital data stream is superimposed is typically directly proportional to the difference between the transmitter carrier frequency and the frequency to which the receiver is tuned. This DC level commonly exhibits a transient maximum upon (or shortly after) initial receipt of an RF carrier by the receiver (and during the time the receiver local oscillator attempts to synchronize with the transmitter carrier frequency) before "stabilizing" to a steady state level.

To detect the digital data stream superimposed upon a DC component, digital radio receivers generally include a limiter circuit which distinguishes between the DC component and the digital signal stream superimposed upon the DC component—and produces an output responsive only to the digital signal stream. A simple such limiter circuit compares the received signal with a predetermined fixed threshold level. Any time the signal level is above the threshold level, the limiter produces a logic level 1 output—and the limiter produces a logic level 0 output whenever the level of the received signal is below the threshold level.

Since the DC level of the received signal varies with the difference between the incoming carrier frequency and the receiver tuning frequency, DC biases within the radio circuitry, and other factors, use of a fixed limiter threshold leads to signal detection errors. An improved prior art limiter averages the incoming signal in order to track changes in the receiver DC bia—and uses the signal average as the threshold level. Such averaging limiters are called "adaptive" because they adapt to changes in the incoming signal DC component.

FIG. 1A is a graphical illustration of a received digital signal waveform 10 relative to a non-adapting (i.e., fixed) DC threshold level 12. As mentioned previously, digital signal stream 10 is superimposed upon a DC level which changes with time. At a time $t_0$, threshold level 12 can be used by a signal comparator to distinguish between digital signal logic level 0 and logic level 1 because it falls about midway between those two logic levels. As the receiver local oscillator frequency changes with respect to the transmitter carrier frequency (and/or receiver bias shift occurs), however, the DC level upon which the digital signal is superimposed shifts, causing both the digital signal logic level 0 and the digital signal logic level 1 to shift relative to fixed threshold level 12. By time $t_1$ in the example the fixed threshold level 12 is about the same as digital signal logic level 1 and can no longer be used to differential between logic level 0 and logic level 1. As FIG. 1A demonstrates, soon after the DC component of the incoming signal shifts, a non-adapting limiter begins detecting only logic level zeros or logic level ones.

FIG. 2 is a schematic diagram of a prior art adapting limiter circuit 20. In this circuit, comparator 22 is used to compare the instantaneous value of the incoming signal $V_{in}$ with an integrated (averaged) version of the incoming signal (signal level averaging being performed by RC network 24). More particularly, a first resistor 26 connects $V_{in}$ to the non-inverting input of comparator 22, and a resistor 28 connects $V_{in}$ to the inverting input of the comparator. A capacitor 30 connected between the comparator inverting input and ground (reference) potential stores charge and resists changes in the voltage level present at the comparator inverting input. The voltage $V_c$ present across capacitor 30 can be used as an adapting threshold level 12, since it has a value approximately equal to the average DC level of the incoming signal $V_{in}$ over a short time period the duration of which depends on the time constant of RC network 24 (and is therefore about midway between signal logic level 1 and logic level 0).

When the signal level at the comparator non-inverting input exceeds the signal level at the comparator inverting input, comparator 22 detects a logic level 1 and applies the logic level 1 output signal to the input of modem 32. When the signal level at the comparator non-inverting input is less than the DC level stored by capacitor 30, comparator 22 detects a logic level 0 and applies a logic level 0 signal level to the input of modem 32.

Modem 32 groups the incoming serial digital data bits into parallel bit units (e.g., bytes) convenient for processing by microprocessor 34 and communicates these signal units to the microprocessor for analysis. The microprocessor may detect and/or decode the incoming digital signal in a conventional manner.

FIG. 1B is a graphical illustration of the same incoming digital signal 10 shown in FIG. 1A relative to an adapting threshold level 12 produced by RC network 24 of the FIG. 2 adapting limiter circuit. Because threshold level 12 adapts to the changing DC component of the incoming signal, the limiter successfully distinguishes between digital signal logic level 1 and digital logic level 0 despite changes in the DC component due to receiver bias, receiver tuning, and other effects.

Resistor 28 and capacitor 30 values must be selected appropriately to allow circuit 20 to adapt quickly enough to the changing DC component without adapting too rapidly. The time constant of RC network 24 should be sufficiently fast to adapt to drift in the incoming signal DC component. But because a long string of logic level 1s or logic level 0s changes the average DC level of the incoming signal over the duration of the string, the time constant of RC network 24 cannot be too fast or else circuit 20 begins to detect bits improperly because it "adapts" to the content of the incoming digital signal rather than only to the more slowly changing DC component on which the incoming signal is superimposed.

Further complications arise if the incoming digital signal includes significant low frequency components. For example, General Electric's Public Service Trunking Communications System transmits and receives digital data signals having significant frequency components as low as 10 Hz (e.g., subaudible digital signalling used to confirm proper channel allocation and/or to direct units to other channels in order to receive a higher priority call). The averaging process performed by RC network 24 is the equivalent of high-pass filtering in the frequency domain—and the network must pass frequencies as low as 10 Hz if modem 32 is to receive the intelligence carried by the low frequency components. The RC network must have a very slow time constant if the threshold level is not to "adapt" to the lower frequency components of the incoming digital signal.

It is highly desirable for the receiver to begin reliably detecting the incoming digital signal as soon as possible after initial carrier signal receipt. With an RC time constant which is long enough to prevent limiter circuit 20 from adapting to a 10 Hz bit rate, the circuit takes a long time to adapt to shifts in the varying DC component the incoming digital signal is superimposed upon. As a result, the receiver may take 20-30 milliseconds or more to adapt after first receipt of the carrier signal.

One possible solution to this problem is discussed in U.S. Pat. No. 4,631,737 to Davis et al (1986). This patent discloses a limiter circuit which detects the "peaks" (maxima) and "valleys" (minima) of the incoming signal. Davis et al's limiter sets a limiter threshold level to the midpoint between the average maximum signal level and the average minimum signal level. This is a general solution to the DC drift/offset problem, and also functions effectively for any type of signal (e.g., incoming digital signal sequences having more logic level 1 bits than logic level 0 bits or vice versa).

One disadvantage to this approach is that it is relatively complex—requiring minima and maxima signal level detection circuitry.

Davis et al discuss (at Column 3, lines 27-64; see also FIG. 2) a data limiter circuit within an RF receiver some circuitry of which is powered off during periods of inactivity in order to save battery power. The limiter includes a transistor which functions as a switch to change the time constant of a coupling network between the receiver and the limiter—allowing proper bias voltage level to be established on the coupling capacitor during initial receipt of a signal before the receiver has been fully activated. The transistor alters the RC time constant to a value needed for proper operation of the limiter when a battery saver circuit restores interrupted power to the receiver circuitry. Davis et al observe that this circuit suffers from the disadvantage that for FSK binary signalling the received bit stream must have nearly a fifty percent duty cycle of 1s and 0s during the time the capacitor is being rapidly charged (for otherwise the resultant bias voltge established on the capacitor is not the appropriate level needed for correct operation of the limiter).

Another approach is disclosed in U.S. Pat. No. 4,575,863 to Butcher et al (1986). Butcher's fast recovery biass circuit includes a limiter circuit which adaptively alters the receiver limiter operating bias level based on detection of a word synchronization bit pattern. The combination of resistors 24 nd 26 (see FIG. 2) forms a low-pass filter with a corner frequency of about 50 Hz when a switch 40 is activated. Capacitor 32 rapidly charges to the average voltage of the received data signal. Comparator 34 processes the received data signal to provide binary 1-0 information to the data decoder 20.

If a word sync binary pattern is detected by the Butcher data decoder 20, switch 40 is deactivated—reducing the corner frequency of the input circuit to approximately 5 Hz. The increased time constant (that is, reduced corner frequency) prevents reference voltage shifts which could normally occur due to long strings of ones and zeros in a binary signal pattern. When an end of message condition is detected by decoder 20, switch 40 is once again activated to decrease the input circuit time constant.

The Butcher et al limiter arrangement provides increased limiter adaptivity rate at the beginning of a received message. However, further improvements are possible.

In General Electric's new "Public Service Trunking" communication protocol (see commonly-assigned application Ser. No. 056,922 of Childress entitled "Trunked Radio Repeater System" filed June 3, 1987), a "slotted" dedicated control channel is used to pass digital channel allocation request signals from mobile transceivers acquiring service to the site controller. In an exemplary embodiment described in that copending application, the control channel is fully duplexed so that there may be simultaneous "in-bound" and "out-bound" control channel signalling. The system is "digitally" trunked in that trunking control is effected by digital signals passed over the continuously dedicated time division multiplexed "control" data channel.

FIG. 3 schematically shows calling protocol for inbound and out-bound frequencies of the dedicated control channel in GE's Public Service Trunking System. A mobile transceiver desiring to communicate via a repeater transmits a channel request message on the control channel in-bound frequency—this channel request message having a total duration (including time for transmitting bit and word synchronization fields and error checking fields) of only 30 milliseconds. The repeater receives, decodes and processes the channel request message, and within 60 milliseconds after the last part of the channel request message has been received, transmits a responsive channel assignment message on the outbound control channel (this assignment message specifying a working channel frequency as well as other information). The mobile transceiver receives the channel assignment message and changes frequency to the working channel specified by the channel assignment message—the entire channel request/allocation process being completed within 280 milliseconds after the time the calling mobile transceiver began transmitting the channel request message.

FIG. 4 is a schematic diagram of exemplary formats for the messages shown in FIG. 3. Reference numeral 80 refers to the outgoing recurring signals transmitted by the repeater on the out-bound control channel frequency, while reference numeral 82 refers to the channel request message transmitted by the mobile transceiver on the in-bound control channel frequency.

In the preferred embodiment, the channel request message is preceded by 152 bits of dotting pattern (i.e., a string of alternating binary valued bits—101010). Following the dotting pattern, three repetitions of a work ("frame") synchronization code (a 16 bit Barker code in the preferred embodiment) are transmitted, after which is transmitted a 40 bit message specifying the type of communications required and an indentification of the calling and called mobile units (in the preferred embodiment, the message portion is transmitted three times, once inverted, to increase the probability of correct reception).

In the preferred embodiment, all signalling occurs at 9600 baud in order to improve system response time. One of the diagram objectives set forth in the "APCO-16 Requirements" (published by the Association of Police Communications Officers) is that any user must have voice channel access within one-half second after engaging a push-to-talk (PTT) switch. The exemplary embodiment utilizes the highest possible data rate (e.g., 9600 bps on the typical 25 KHz bandwidth radio channel) for critical control channel signalling in order to ensure very rapid voice channel access. The 320 bit-long channel request message transmitted on the in-bound control channel frequency by the mobile unit is transmitted at 9600 baud in only 33 milliseconds or so—and the initial 152 bit dotting portion of the channel request message has a duration of only about 16 milliseconds.

It will be appreciated by those skilled in the art that when such short message durations are involved, it is especially critical for receivers (e.g., the repeater receiver) to very rapidly begin properly detecting incoming signal levels. For example, the repeater receiver limiter must begin properly and reliably decoding the incoming signal by the time the Barker code portion of the channel request message is received if proper frame synchronization is to be acquired.

The limiter disclosed in the Butcher et al patent operates at a high adaptivity rate (time constant = 20 milliseconds) until word sync (e.g., Barker code) has been received and successfully decoded. Decoding word sync, however, takes a substantial amount of time (a typical word synchronization bit pattern is 10 or more bits long). Moreover, the receiver must acquire bit synchronization before it can properly decode the word synchronization bit pattern. Significant problems result from waiting until after the word synchronization code has been properly detected before increasing the limiter adaptivity time constant.

Transmission of dotting pattern permits a receiver to very rapidly acquire bit synchronization. In fact, no other bit pattern allows a receiver to synchronize with the incoming bit timing as rapidly and efficiently. In addition, dotting pattern can be decoded very rapidly and successfully because it is a simple, alternating binary valued bit pattern—and an arbitrary desired number of received dotting pattern bits can be tested to determine whether the dotting pattern has been received.

It is therefore highly advantageous for every message to be preceded by a dotting pattern (see, e.g., commonly-assigned U.S. Pat. No. 4,663,765 issuing to Sutphin on May 5, 1987, disclosing a communications receiver which unmutes audio output in response to proper detection of a dotting pattern preamble).

Another important design goal is conservation of the processing capabilities of the receiver microprocessor used to decode and process incoming signals. When incoming signalling is received, the digital signal processor associated with the control channel typically must cease performing other tasks and begin processing the incoming signals. If the processor determines that the incoming signalling is intended for it and must be decoded, it typically must devote substantially all of its processing cycles to decoding and otherwise processing the incoming signalling. On the other hand, if the processor determines that the incoming signalling need not be decoded (e.g., the signalling may not match a predetermined protocol and therefore can be ignored), the processor can perform other useful tasks (e.g., maintenance functions) instead. It is therefore desirable for the processor to determine as rapidly as possible whether it must continue to decode incoming signalling—since reaching this decision at the earliest possible point provides more time for the procesor to perform other functions.

There is another advantage to deciding as early as possible whether incoming signalling must be decoded. Spurious signals occasionally resemble "proper" signals—sometimes causing the decoding processor to mistake the spurious signals for the ones it must decode. For example, the bit pattern of a predetermined frame synchronization word might be found embedded within a digitized voice signal transmission—or even in a received noise signal. "Falsing" occurs when the receiver's decoding circuitry mistakenly determines it has received the predetermined bit pattern it uses to distinguish "legitimate" transmissions from spurious signals when in fact it has received a spurious signal. Elimination or reduction of falsing is an important design objective, since falsing degrades overall system security and performance.

The dotting pattern preceding all messages transmitted in the General Electric Public Service Trunking System facilitates a solution to these problems which is easy to implement, reduces falsing rate and provides extremely rapid receiver adaptivity.

The dotting pattern (alternating binary valued 0 and 1 bits) is the optimal bit pattern for acquiring bit synchronization in the least amount of time—and this is why General Electic has chosen to begin each message with this dotting pattern.

Since all messages are preceded by the dotting pattern, the receiver microprocessor does not need to process any incoming data stream unless and until a dotting pattern has been detected. Falsing rate is decreased by requiring detection of a dotting pattern before processing input signals—and the microprocessor is free to perform other tasks since it can ignore incoming signals not preceded by a dotting pattern. If a circuit external to the microprocessor is used for dotting pattern detection, the microprocessor can ignore incoming signals until the external circuit has successfully detected dotting pattern.

The present invention provides a limiter/detector which takes advantage of the characteristics of the dotting pattern which precedes each message in the General Electric Public Service Trunking System. The lowest frequency component present in a 9600 baud dotting pattern of alternating binary valued signals (101010...) is 4.8 KHz. Audio exists between 300 Hz and 3000 Hz—and the bandpass required by transmitted data extends from 10 Hz to 5 KHz. The present invention takes advantage of the dotting pattern frequency spectrum characteristics in order to shorten the bit synchronization acquisition time and improve incoming signal detection.

Since the lowest frequency component in the dotting pattern is 4800 Hz, the time constant of the receiver adaptive limiter can be decreased from 0.1 seconds to 0.33 microseconds (corresponding to a cut-off frequency of 3 KHz—much higher than the 50 Hz corner frequency used by Butcher et al, resulting in a corresponding more rapid adaptivity rate) during the time a dotting pattern is (or might be) received.

This decreased time constant allows the limiter provide by this invention to adapt much more rapidly to the DC component of the incoming data signal. The dotting pattern is detected 5 to 10 milliseconds earlier than in previous limiter signals since the limiter is able to track the "instantaneous" DC level through the transient experienced every time the transmitter begins to transmit. Upon successful decoding of the dotting pattern preceding the message, the limiter circuit time constant is changed to 0.1 seconds to allow lower frequency digital data signal components (e.g., those lower frequency components associated with word sync patterns such as Barker codes) to be passed by the limiter and detected.

The following are some of the advantages obtained by using the adaptive limiter provided by the present invention:
- decreased falsing rate
- more reliable detection of word sync
- more rapid acquisition of bit sync
- better utilization of processing resources
- simplification of initial signal detection routines and/or circuitry
- more rapid adaptivity to incoming signalling

BRIEF DESCRIPTION OF THE DRAWINGS

These and other features and advantages of the present invention will be better and more completely understood by reading the following detailed description in conjunction with the appended sheets of drawings, of which:

FIG. 1A is a graphical illustration of an incoming digital data signal detected using a non-adapting threshold level;

FIG. 1B is a graphical illustration of an incoming digital data signal detected using an adapting threshold level;

FIG. 2 is a schematic diagram of a prior art adaptive limiter circuit;

DETAILED DESCRIPTION OF PREFERRED EMBODIMENTS

Figure 5:
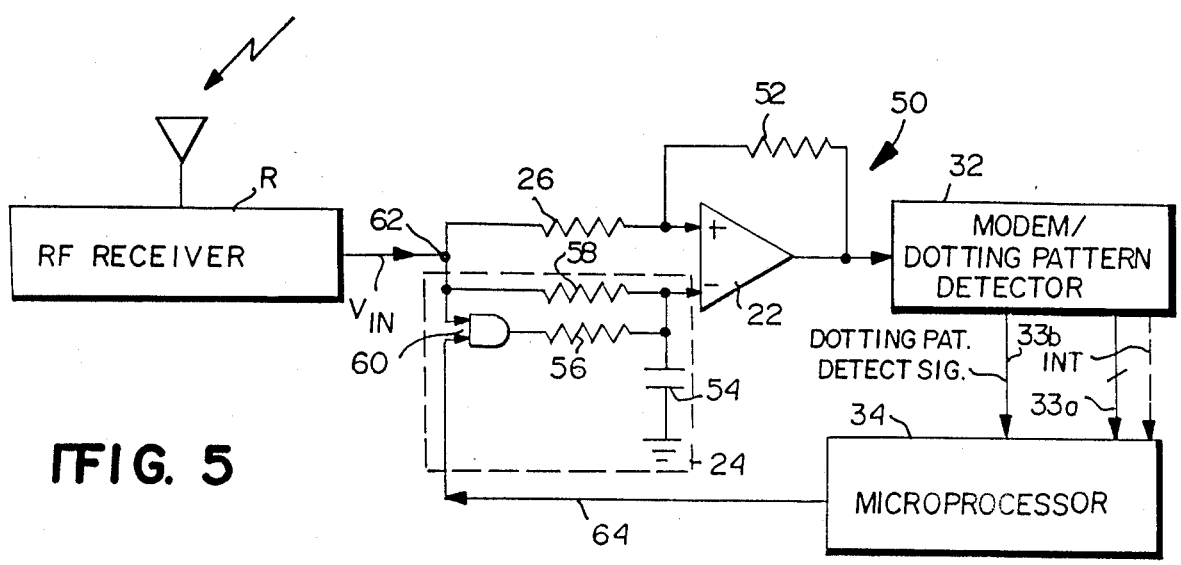
FIG. 5 is a schematic diagram of the presently preferred exemplary embodiment adaptive limiter circuit in accordance with the present invention.

FIG. 5 is a schematic diagram of the presently preferred exemplary embodiment of an adaptive limiter circuit 50 in accordance with the present invention. Limiter circuit 50 includes a comparator 22, a RC network 24, an additional series input resistor 26, a feedback resistor 52, and a modem/dotting pattern detector 32.

Figure 4:
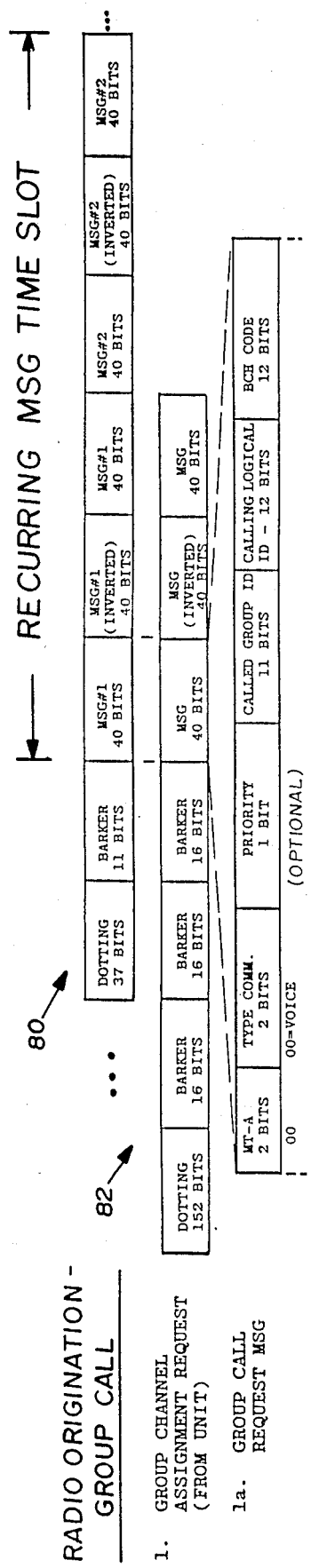
FIG. 4 is a schematic diagram of exemplary signalling formats of the messages shown in FIG. 3.

The limiter circuit 50 is connected to receive an incoming signal $V_{in}$ (e.g., a demodulated version of the channel assignment request message 82 shown in FIG. 4) produced by conventional RF receiver R, this incoming signal typically including a digital signal stream superimposed upon a shifting DC level. Limiter circuit 50 processes the incoming signal stream and generates a version of the stream which it applies to modem/dotting pattern detector 32.

Incoming digital signal stream $V_{in}$ is connected through input resistor 26 to the non-inverting input terminal of comparator 22. A feedback resistor 52 is connected between the comparator non-inverting input and the comparator output terminal. The output terminal of comparator 22 is connected to the input of modem/dotting pattern detector 32 which converts the incoming serial bit stream to parallel format and communicates the resulting parallel digital information to the input of microprocessor 34 over line 33a. Modem/dotting pattern detector 32 also detects the alternating binary valued 0s and 1s of the dotting pattern preceding each incoming message (e.g., using conventional hard-wired detection logic) and produces a signal on line 33b indicating a predetermined number of bits of dotting pattern have been detected. Modem 32 and/or microprocessor 34 also decodes other portions of the incoming digital data.

RC network 24 includes a capacitor 54, a resistor 56, a resistor 58 and a gate ("switching means") 60. Resistor 58 is connected directly between the $V_{in}$ output of receiver R and the comparator 22 inverting input. Capacitor 54 is connected between the comparator inverting input and ground (reference) potential.

Gate 60 in the preferred embodiment is a two-input CMOS AND (or other logic type) gate having a first input terminal connected to $V_{in}$ and a second input terminal connected to an output line 64 of microprocessor 34 (or line 33b produced by modem/dotting pattern detector 32 may be connected directly to this input of gate 60). The output terminal of gate 60 is connected to one end of resistor 56. The other end of resistor 56 is connected to the comparator inverting input.

The resistance of resistor 56 is much lower than that of resistor 58. When microprocessor 34 applies a logic level 1 signal (via line 64) to the input of gate 60, the gate turns ON to effectively place resistor 56 in parallel with resistor 58—decreasing the time constant of RC network 24.

In the preferred embodiment the lowest frequency component in the dotting pattern preceding each incoming message is 4.8 KHz, while the lowest frequency component in received digital data (e.g., word sync pattern) following the dotting pattern is about 10 Hz. In the preferred embodiment, RC network 24 has a time constant of 0.33 milliseconds during the time a dotting pattern is expected to be received (this time constant corresponding to a cut-off frequency of about 3 KHz)—that is, during the time no message is being received (but the receiver is "listening" for a new message) and during the time the initial portion of a new incoming message is being decoded. At other times (i.e., during the time the word sync and data of a message is being received and detected), RC network 24 has a time constant on the order of 0.1 seconds (corresponding to a cut-off frequency of about 10 Hz).

In one exemplary circuit the capacitance of capacitor 54 is about 1 microfarad, the value of resistor 58 is on the order of 100 Kilohms and the value of resistor 56 is on the order of about 330 ohms.

When the signal level present on microprocessor output line 64 is at logic level 0, gate 60 does not turn ON regardless of the level of input signal $V_{in}$, and resistor 56 is effectively disconnected from limiter circuit 50—so that the time constant of RC network 24 is on the order of 0.1 seconds. When microprocessor output line 64 is active (i.e., at a logic level 1 signal level), gate 60 turns on whenever the level of signal $V_{in}$ is above the input threshold level of the gate and resistor 56 is thus effectively placed in parallel with resistor 58—decreasing the time constant of RC network 24 to about 330 microseconds.

Figure 6:
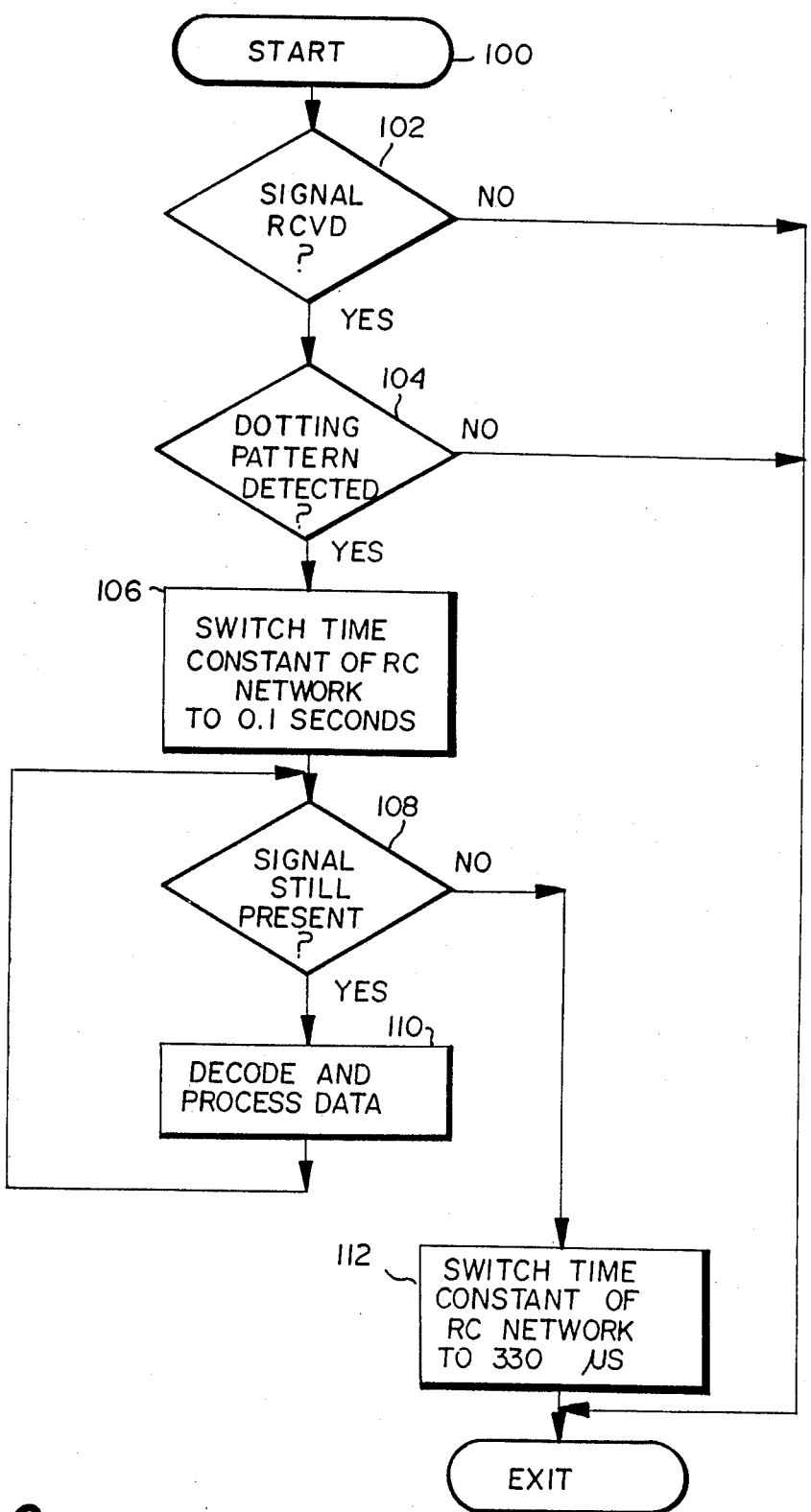
FIG. 6 is a flow chart of exemplary program control steps performed by the circuitry shown in FIG. 5.

FIG. 6 is a flow chart of exemplary program control steps executed by microprocessor 34 (under software control) to detect and decode dotting pattern and other incoming digital data and also to control RC network 24. The flow shown in flow chart 24 is from top to bottom, beginning at "start" block 100.

Microprocessor 34 first determines whether an incoming signal has been received (decision block 102)—tyically by waiting for a so-called "interrupt" signal generated by modem/dotting pattern detector 32 whenever an incoming signal is sensed at the output of the receiver R. During (and before) this time, microprocessor 34 causes its output line 64 to be active—so that resistor 56 is connected in parallel with resistor 58 and RC network 24 has a time constant of about 330 microseconds.

When a signal has been received, microprocessor 34 (or a hard-wired detection circuit of modem/dotting detector 32) detects whether the received signal is a dotting pattern (that is, a stream of alternating binary valued digital signals (block 104). During the time this initial portion of the incoming message is being received and detected, limiter circuit 50 adapts very rapidly to the DC component on which the dotting pattern is superimposed—resulting in dotting pattern detection in 10 milliseconds or less. If a dotting pattern has been received (indicated by an active signal level on line 33b), microprocessor 34 places a logic level 0 signal level on output line 64 to inhibit gate 60 and thereby effectively disconnect resistor 56 from RC network 24 (block 106)—switching the time constant of the RC network to about 0.1 seconds. Meanwhile, modem/dotting pattern detector 32 has already acquired bit synchronization (in a conventional manner) in response to the received dotting pattern and is ready to synchronously receive the Barker code word synchronization pattern following the dotting pattern. The lowest frequency components of the Barker code (and the digital data signals following it) are passed by limiter 50 because of the large limiter bandwidth resulting from disconnection of resistor 56.

Microprocessor 34 (and/or modem/dotting pattern detector 32) acquires word (frame) synchronization in response to receipt of a Barker code and proceeds to process the incoming signal stream (block 110) (e.g., if the received data is digital word synchronization codes, detector 32 or microprocessor 34 detects the word sync codes and acquires frame synchronization from them in preparation for receiving a digital message which follows). Limiter circuit 50 passes all of the lower frequency components of this received digital stream (e.g., down to 10 Hz) because RC network 24 has a large time constant.

When a message has terminated (as indicated, for example, by discontinued receipt of incoming bits tested for by block 108), microprocessor 34 applies a logic level 1 signal to output 64 (block 112) to once again enable gate 60—thus connecting resistor 56 back into RC network 24. When gate 60 is enabled in this manner, RC network 24 again has a time constant of only 330 microseconds—and is capable of adapting very rapidly to the DC component superimposed on the dotting pattern preceding the next message to be received. Gate 60 is enabled in the preferred embodiment at all times except during the execution of blocks 106-110 of the FIG. 6 flow chart (i.e., until after the dotting pattern of a new message has been successfully decoded), so that resistor 56 remains connected in circuit with RC network 24 when the next dotting pattern is received.

Figure 7:
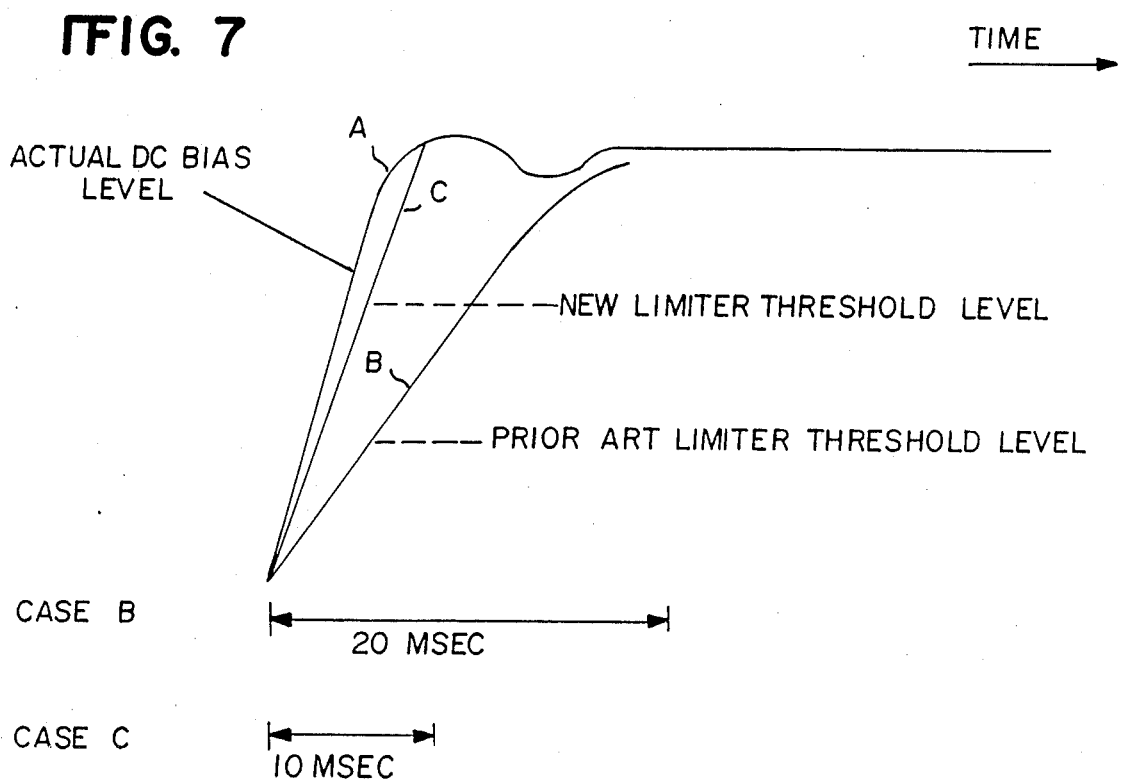
FIG. 7 is a graphical illustration showing the response of the prior art FIG. 2 limiter circuit to receipt of an input signal and the response of the preferred embodiment circuit shown in FIG. 5 to receipt of the same input signal.

FIG. 7 is a graphical illustration of the time it takes the limiter circuits shown in FIGS. 2 and 5 to adapt to an incoming message transmission. The curve labelled "A" is the actual receiver DC bias point (i.e., the level of the DC component upon which the incoming digital signal stream is superimposed). As can be seen, the actual DC bias point rises sharply initially upon receipt of a carrier signal, soon thereafter demonstrates a "hump" during which time the receiver locks onto the transmit carrier frequency, and finally stabilizes approximately 20 milliseconds after first receipt of the signal.

The prior art limiter shown in FIG. 2 is not capable of tracking the rapidly changing DC bias level during the first 20 milliseconds of signal reception because its time constant is too slow (slow enough to pass signal low frequency components but too slow to track the rapidly changing signal level). The curve marked "B" in FIG. 5 shows the value of the voltage across capacitor 54 (the adaptive threshold level) in the FIG. 2 limiter. This adaptive threshold level does not closely match the actual DC bias level until the received signal has "stabilized" —about 20 milliseconds after signal receipt. Detection of incoming digital signals is not possible until this 20 millisecond delay is over.

The curve marked "C" in FIG. 7 shows the voltage across capacitor 54 of the FIG. 5 limiter circuit 50 provided by the present invention. Because the RC time constant of network 24 is relatively short (330 microseconds in the preferred embodiment) during the time the dotting pattern at the beginning of the new message is received, limiter circuit 50 very rapidly adapts to the actual DC bias level, and begins closely tracking the actual bias level in as little as 10 milliseconds or less after receipt of the incoming signal. Proper detection of the dotting pattern preceding the message (and acquisition of bit synchronization in response to this dotting pattern) is rapid and occurs as early as 10 milliseconds or less after the first bit of the dotting pattern is received.

The limiter circuit provided by the present invention has significant advantages over the prior art limiter circuit. Because the preferred embodiment limiter circuit very rapidly adapts to the DC bias component superimposed upon the received digital signal, the receiver can detect the dotting pattern in a much shorter time than could receivers in the prior art. The duration of the dotting pattern may thus be decreased substantially, reducing signalling "overhead" and providing more time for transmission of useful data signals.

Figure 3:
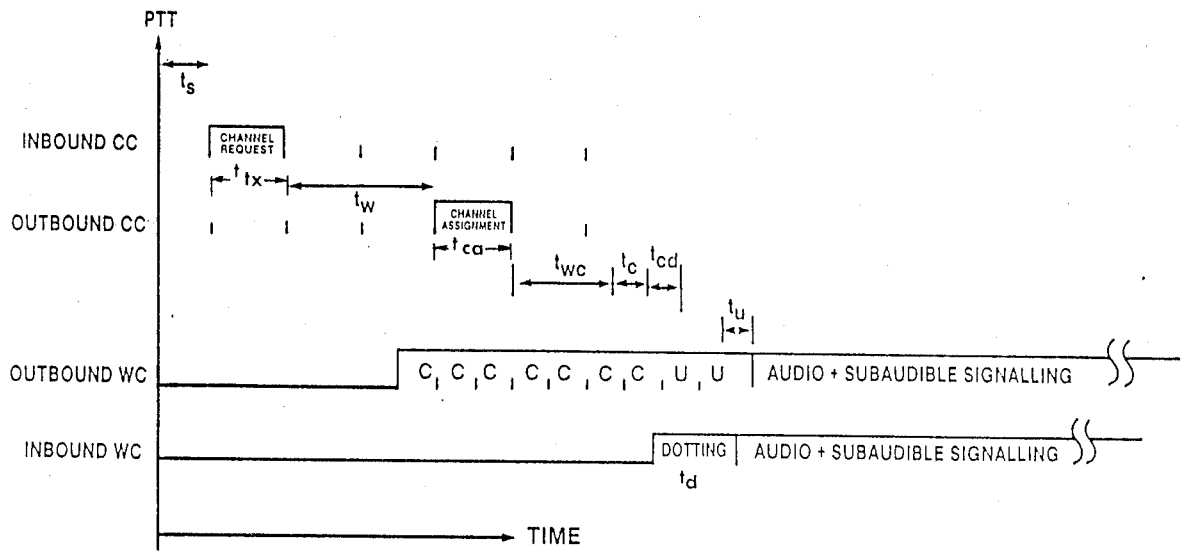
FIG. 3 is a schematic diagram of control and work channel signalling in an exemplary digitally trunked communications system.

For example, if a time-division multiplexed "slotted" (or other timing critical) control channel is used in a trunking radio telephone communications system to convey control information between transceivers and a repeater as shown in FIGS. 3 and 4, acquisition signals must be transmitted on the "inbound" control channel in a "slot" (time period) of limited duration (e.g., 30 ms). If the receiver requires a long time period to acquire bit synchronization, little time remains within the time slot for transmission of acquisition or other contact signals. If the duration of the time slot is increased, loading capacity of the channel is decreased proportionally—and the entire system cannot handle as much message traffic. Accordingly, it is desirable to minimize the duration of the time slot.

The present invention accomplishes exactly that by allowing receivers to detect the dotting pattern message preamble even before the DC bias level of the repeater receiver has "stabilized". In addition, the repeater receiver processes a received signal only after successfully receiving and decoding dotting pattern, falsing rate is decreased substantially over the obtainable simply by using Barker code or other word sync pattern detection as in the Butcher et al arrangement—and detection of the Barker code (word sync) can be improved since not all of the bits of the Barker code need to be properly detected in order to obtain proper word synchronization (compare this with the Butcher et al scheme, which requires proper detection of the entire word sync pattern before the limiter RC time constant is increased).

While the present invention has been described with what is presently considered to be the most practical and preferred embodiments, it is to be understood that the appended claims are not to be limited to the disclosed embodiments, but on the contrary, they are intended to cover all modifications, variations and/or equivalent arrangements which retain any of the novel features and advantages of this invention. By way of non-limiting example, although the preferred embodiment uses a gate 60 to switch resistor 56 into and out of RC network 24, other suitable switching means (e.g., a switching capacitor, a transistor, or even a relay) could be used as if desired.

What is claimed is:

1. A digital radio frequency communications receiver including:

integrating means, connected to receive an incoming signal including an alternating digital signal superimposed upon a DC level, for integrating said incoming signal over a predetermined time constant period;

signal comparing means for comparing said incoming signal with said integrated incoming signal and for producing an output signal responsive to the results of said comparison;

signal detecting means for detecting the occurrence of an alternating binary valued dotting pattern in said signal comparing means output signal, said dotting pattern maximizing the number of bit transitions over said time constant period and having an average value over an even number of bit times equal to said DC level;

time constant selecting means connected to said integrating means for changing said predetermined time constant from a first value to a second value in response to detection by said detecting means of said dotting pattern; and further signal detecting means for detecting the occurrence of a word synchronization bit pattern different from said dotting pattern in said signal comparing means output signal.

2. In a digital radio frequency communications receiver of the type which receives and demodulates a radio frequency signal to produce a baseband signal, an adaptive limiter comprising:

threshold level producing means for producing a time-averaged version of said received digital signal stream;

signal comparing means for producing an output whenever the level of said baseband digital signal stream exceeds the level of said time-averaged version of said stream;

dotting pattern detecting means for detecting the occurrence of an alternating binary valued dotting pattern in said comparing means output, said dotting pattern maximizing the number of bit edges over a given time period; and switching means connected to said threshold level producing means for decreasing the rate at which said producing means responds to changes in said baseband signal upon detection by said detecting means of said dotting pattern occurrence; and further signal detecting means for detecting the occurrence of a word synchronization bit pattern different from said dotting pattern in said signal comparing means output signal.

3. In a digital radio frequency communications receiver of the type which receives and demodulates a radio frequency signal to produce a baseband signal, said signal including a word synchronization bit pattern preceded by a dotting pattern, an adaptive limiter circuit connected to receive said baseband signal comprising:

threshold level producing means for producing an average over time of the level of said baseband signal, said producing means responding to changes in said baseband signal level alternately at a first rate and at a second rate different from said first rate;

signal comparing means for producing an output whenever the level of said baseband signal exceeds the level of said time-averaged level;

dotting pattern detecting means for detecting the occurrence of an alternating binary valued dotting pattern in said comparing means output, said dotting pattern maximizing the number of bit transitions over a given time period; and switching means for changing said threshold level producing means from said first rate to said second rate upon detection by said detecting means of said dotting pattern occurrence; and further signal detecting means for detecting the occurrence of a word synchronization bit pattern different from said dotting pattern in said signal comparing means output signal.

4. In a digital radio frequency communications receiver of the type which receives and demodulates a radio frequency signal to produce an incoming baseband signal, an adaptive limiter circuit connected to receive said baseband signal and comprising:

lowpass filter means for filtering out components of said baseband signal above a preset frequency so as to produce a filtered baseband signal;

signal comparing means for producing an output whenever the level of said incoming baseband signal exceeds the level of said filtered baseband signal;

dotting pattern detecting means for detecting the occurrence of an alternating binary valued dotting pattern in said comparing means output, said dotting pattern maximizing the number of bit edges occurring over a certain time interval and having an average DC level equal to the average DC level of said incoming baseband signal; and means connected to said filter means for setting said preset frequency to approximately 3 kilohertz, and for changing said preset frequency to approximately 10 hertz upon detection of said dotting pattern occurrence; and further signal detecting means for detecting the occurrence of a word synchronization bit pattern different from said dotting pattern in said signal comparing means output signal.

5. In a digital radio frequency communications receiver of the type which receives and demodulates RF signals to produce a stream of digital signals superimposed on a varying DC level, an adaptive limiter circuit including:

means for filtering said digital signal stream from said varying DC level and for outputting said digital signal stream;

dotting pattern detecting means connected to receive said filtering means output for producing a control signal upon detection of receipt of an alternating binary valued dotting pattern in said digital signal stream;

said filtering means being connected to said control signal, said filtering means responding to changes in said received and demodulated RF signals at a first rate before detected receipt of said dotting pattern and at a second rate much less than said first rate after detected receipt of said dotting pattern; and digital signal processing means, connected to receive said control signal and said filtered digital signal stream, for processing said filtered signal stream beginning upon receipt of said control signal, said processing means including means for detecting the occurrence of a word synchronization bit pattern different from said dotting pattern.

6. In a digital radio frequency communications receiver, a method of decoding an incoming RF signal comprising:

(a) receiving a radio frequency carrier signal modulated by a digital signal stream;

(b) demodulating said received carrier signal to produce a demodulated signal including a digital signal stream superimposed upon a changing DC level;

(c) integrating said demodulated signal over time at a first rate so as to produce a threshold level;

(d) producing an output signal whenever said demodulated signal exceeds said threshold level;

(e) testing for the occurrence of an alternating digital binary valued dotting patern in said output signal;

(f) integrating said demodulated signal over time at a second rate substantially less than said first rate so as to produce said threshold level beginning when said testing step reveals said dotting pattern occurrence;

(g) producing an output signal whenever said demodulated signal exceeds said threshold level produced by step (f); and (h) testing for occurrence of a predetermined word synchronization pattern in said output signal produced by said step (g) subsequently to performing said testing step (e).

7. A method of achieving reliable and prompt communication within a trunked radio repeater system having a digital control channel and plural working channels, which working channels are assigned for temporary use of individual radio units specified by digital control signals on the control channel, said method including:

(1) receiving transmitted request message signals including (a) a string of alternating binary valued dotting bits preceding (b) a predetermined word sync code repeated three times preceding (c) a request code field, said request message having a duration of about 30 milliseconds;

low-pass filtering said received request message signals to produce a threshold level responsive substantially only to signal components within said received message that are below a first frequency;

producing an output signal whenever the level of said received request message signals exceeds said threshold level;

detecting the occurrence of said dotting bits in said output signal;

low-pass filtering said received request message signals to produce a further threshold level responsive substantially only to signal components within said signals that are below a second frequency much less than said first frequency beginning upon detection of said dotting bits occurrence;

producing an output signal whenever the level of said received request signals exceeds said further threshold level;

acquiring word synchronization in response to occurrence of said word sync code in said output signal; and decoding said request code after acquiring word synchronization.

8. A method of achieving reliable and prompt communication within a trunked radio repeater system having a digital control channel and plural working channels, which working channels are assigned for temporary use of individual radio units specified by digital control signals on the control channel, said method including:

receiving and demodulating transmitted RF signals;

low-pass filtering said received and demodulated signals to produce a threshold level responsive substantially only to signal components within said signals that are below a first frequency;

producing an output signal whenever the level of said received request signals exceeds said threshold level;

detecting the occurrence of a string of alternating binary valued dotting bits in said output signal;

substantially simultaneously with said detecting step, obtaining bit synchronization in response to said dotting bits in said output signal;

low-pass filtering said received request signals to produce a further threshold level responsive substantially only to signal components within said signals that are below a second frequency much less than said first frequency beginning upon detection of said dotting bits occurrence;

producing an output signal whenever the level of said received and demodulating signals exceeds said further threshold level;

acquiring word synchronization in response to occurrence in said output signal subsequent to said dotting bits of a predetermined word sync code repeated at least once; and after acquiring word synchronization, decoding a request message occurring in said output signal.

* * * * *